United States Patent
Boussaad

(10) Patent No.: US 8,277,936 B2
(45) Date of Patent: Oct. 2, 2012

(54) HEXAGONAL BORON NITRIDE COMPOSITIONS CHARACTERIZED BY INTERSTITIAL FERROMAGNETIC LAYERS, PROCESS FOR PREPARING, AND COMPOSITES THEREOF WITH ORGANIC POLYMERS

(75) Inventor: Salah Boussaad, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 259 days.

(21) Appl. No.: 12/641,350

(22) Filed: Dec. 18, 2009

(65) Prior Publication Data

US 2010/0159244 A1 Jun. 24, 2010

Related U.S. Application Data

(60) Provisional application No. 61/139,898, filed on Dec. 22, 2008.

(51) Int. Cl.
*B32B 5/22* (2006.01)
*C04B 35/5833* (2006.01)
*C08K 3/38* (2006.01)
*C08L 63/00* (2006.01)
*C08L 79/08* (2006.01)
*B32B 27/20* (2006.01)
*B32B 27/28* (2006.01)
*B32B 27/38* (2006.01)

(52) U.S. Cl. ........ 428/323; 501/96.4; 523/445; 524/404

(58) Field of Classification Search .................. 428/323; 501/96.4; 523/445; 524/404
See application file for complete search history.

(56) References Cited

U.S. PATENT DOCUMENTS

| 4,008,055 | A |   | 2/1977 | Phaal |   |
|---|---|---|---|---|---|
| 4,731,302 | A | * | 3/1988 | Weissmantel et al. | 428/698 |
| 5,602,062 | A | * | 2/1997 | Sato et al. | 501/96.4 |
| 2001/0004546 | A1 |   | 6/2001 | Tobita et al. |   |
| 2003/0153665 | A1 |   | 8/2003 | Tobita et al. |   |
| 2007/0054122 | A1 |   | 3/2007 | Paisner et al. |   |
| 2011/0045223 | A1 | * | 2/2011 | Lin et al. | 428/36.9 |
| 2011/0163298 | A1 | * | 7/2011 | Sung | 257/29 |
| 2011/0204409 | A1 | * | 8/2011 | Sung et al. | 257/99 |

FOREIGN PATENT DOCUMENTS

| BR | 11 21 75901169 |   | 1/1976 |
|---|---|---|---|
| CS | 243893 | B1 | 6/1987 |
| ZA | 704346 |   | 6/1970 |

OTHER PUBLICATIONS

J. H. Edgar, Common crystal structures of group III nitrides, Feb. 1994, Chapter 1, p. 8.

* cited by examiner

*Primary Examiner* — Michael J Feely

(57) ABSTRACT

The present invention relates to a hexagonal boron nitride platelet particle having a layer of a ferromagnetic metal between the layers of hexagonal boron nitride thereof, and a process for preparing the composition thereof. The present invention further relates to polymeric composites formed therefrom. The present invention describes improvements in thermal conductivity of said composites when subject to an orienting magnetic field.

20 Claims, 13 Drawing Sheets

HEXAGONAL BORON NITRIDE COMPOSITIONS CHARACTERIZED BY INTERSTITIAL FERROMAGNETIC LAYERS, PROCESS FOR PREPARING, AND COMPOSITES THEREOF WITH ORGANIC POLYMERS

FIELD OF THE INVENTION

The present invention relates to hexagonal boron nitride platelet particles having a layer of a ferromagnetic metal between the layers of hexagonal boron nitride, polymeric composites formed therefrom, and to methods for preparing same.

BACKGROUND OF THE INVENTION

Boron Nitride (BN) occurs in both cubic and hexagonal crystalline form. The two forms exhibit quite different properties associated with the structural difference. Cubic boron nitride is the second hardest material known. Hexagonal boron nitride (hBN) is readily machinable.

The structure of hBN is discussed in Edgar, *Properties of Group III Nitrides*, Chapter 1, p. 8. According to Edgar, hBN is a layered structure, closely analogous to graphite. In hBN the layers are stacked in perfect registration where the hexagonal rings in all layers coincide. However, the positions of N and B alternate from layer to layer, resulting in the structure depicted in FIG. 1. According to Edgar, the B—N bond length within the layers is much shorter (0.1446 nm) than the B—N bond length between layers (0.33306 nm).

Phaal et al., U.S. Pat. No. 4,008,055, prepared nickel coated cubic boron nitride needles that were incorporated into a resin base and oriented in a magnetic field to form an abrasive tool.

Caveney et al., South African Patent Application 704346, discloses an epitaxial coating of Ni, Fe, or Co adjacent to the surface of a cubic BN particle for use in forming an abrasive tool.

Li et al., Metallurgical and Materials Transactions, B, 38B, 149ff, (2007), discloses the surface coating of hBN particles with a dense coating of Ni.

Dennis et al., Brazilian Patent Application (11)(21)7501169 discloses the growth of epitaxial titanium boride crystals on the surface of cubic BN particles.

Vladimir et al., Czechoslovak Patent 243893, disclose a process for preparing hBN particles with epitaxial Ni on the surface of the particles thereof.

SUMMARY OF THE INVENTION

In one aspect, the present invention provides a composition comprising hexagonal boron nitride platelet particles comprising a plurality of registered layers of hexagonal boron nitride and a ferromagnetic metal interstitially disposed between said layers of boron nitride.

In another aspect, the present invention provides a process comprising
combining an aqueous solution of a salt of a ferromagnetic metal and $NH_4OH$ in a molar ratio of metal to $NH_4^+$ in the range of 1:10 to 10:1 to form an aqueous solution.
combining hexagonal BN in particulate form with the solution so formed to form a slurry;
drying said slurry; and,
annealing said dried slurry in a reducing atmosphere at a temperature in the range of ca. 300° C. for a minimum exposure period of 60 min to ca. 900° C. for a minimum exposure period of 5 min.

In another aspect, the present invention provides a composite comprising an organic polymer and particles of a modified hexagonal boron nitride (hBN) dispersed therewithin, said modified hexagonal boron nitride comprising a plurality of registered layers of hexagonal boron nitride and a ferromagnetic metal interstitially disposed between said layers of boron nitride.

In another aspect, the present invention further provides a process comprising
dispersing modified hBN particles in a flowable organic polymer composition to form a flowable composite;
casting a film with said flowable composite;
subjecting said cast film, while still in the flowable state, to an orienting magnetic field, thereby causing at least a portion of the modified hBN particles to become magnetically oriented particles; and,
causing said film to be converted to the non-flowable state while at least a portion of said magnetically oriented particles retain their magnetic orientation.

Figure 1:
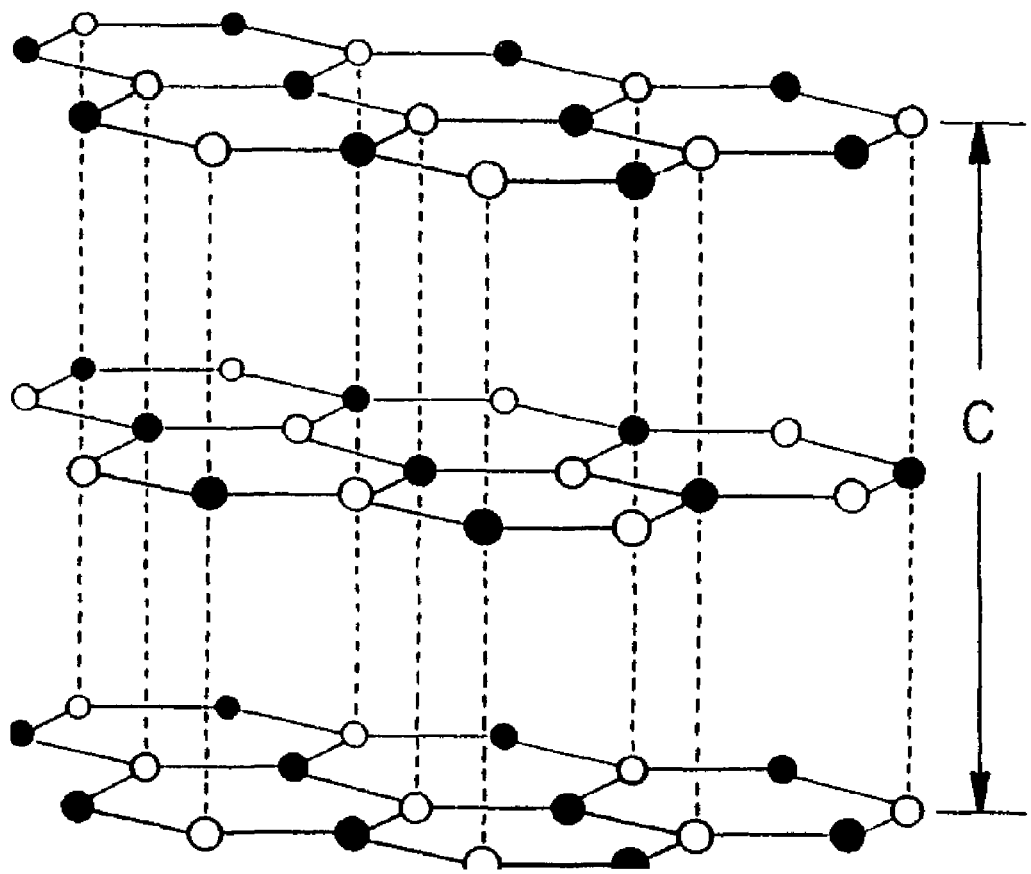
FIG. 1 is a schematic representation of the structure of hexagonal boron nitride (hBN) showing the registration of adjacent platelet layers.
Figure 2:
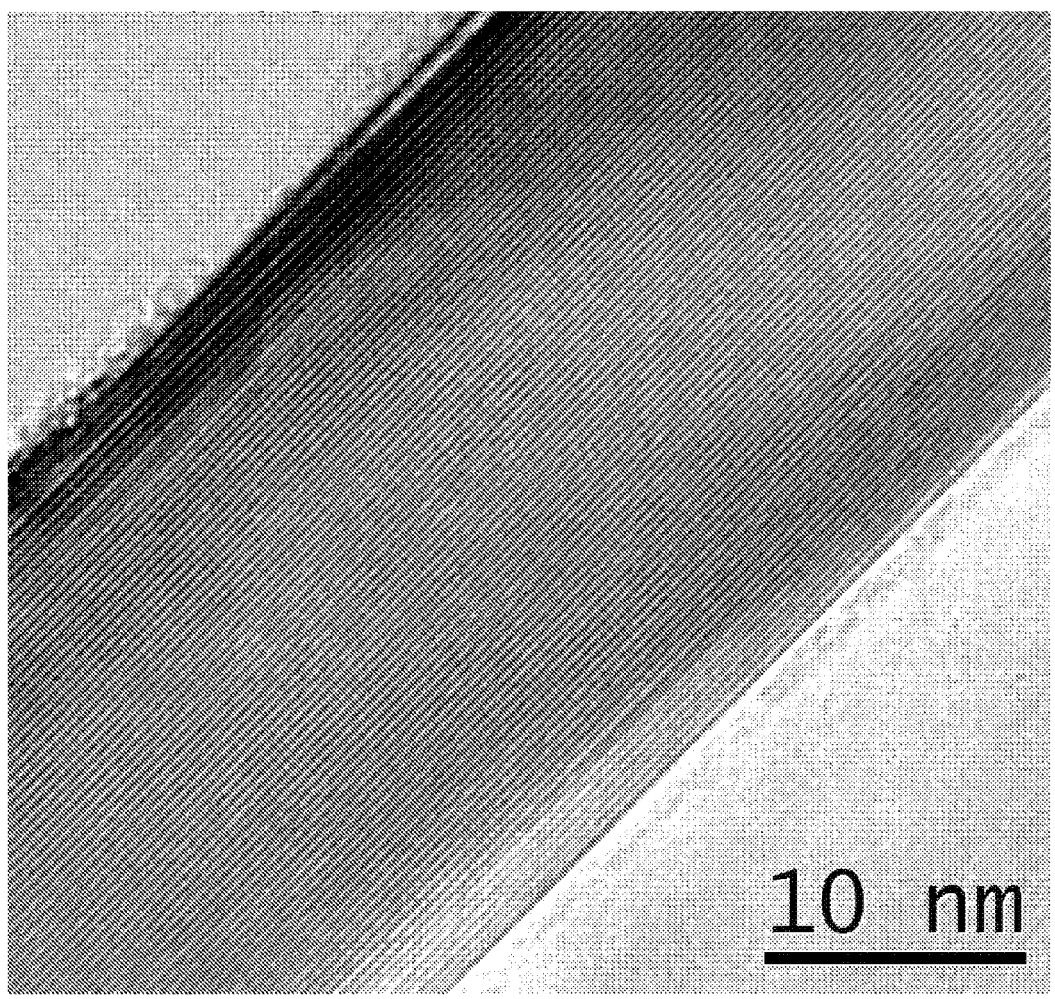
FIG. 2 is a transverse electron micrograph (TEM) of a cross-section of as-received, unmodified hBN showing the tight packing and linear character of the layered platelet structure.

DETAILED DESCRIPTION hBN exists in the form of platelet particles comprising multiple layers of boron nitride as shown schematically in FIG. 1, and shown also in FIG. 2 which depicts a cross-sectional TEM of an hBN platelet particle. The regular ordering between adjacent layers shown in FIG. 1 is referred to herein as "registration" and the layers are said to be "registered." This registered structure is distinct from turbostratic boron nitride in that turbostratic boron nitride exhibits little or no registration between adjacent layers. X-ray diffraction (XRD) reveals the structural difference between registered and turbostratic boron nitride, as described infra.

hBN exhibits both high electrical resistivity and high thermal conductivity making it a desirable additive to composite materials when improved heat transfer through electrically insulating materials is desired. One application for a heat-transfer-enhanced material is in the fabrication of small flexible printed circuits where heat generation is confined to a small volume, and heat must be dissipated as quickly as possible. Thermal conductivity of hBN in a direction parallel to the plane of the platelet particle can be an order of magnitude higher than in the direction normal to the plane of the particle. The composition of the invention is a modified hBN particle that is readily orientable by the application of a magnetic field of ≦1000 gauss without sacrifice of the electrical resistivity of neat hBN. This is achieved by incorporation of a small amount of a ferromagnetic metal—typically about 5% by weight—in the interstices between adjacent registered layers of the boron nitride. By virtue of magnetic orientability, the direction of greatest thermal conductivity can be adjusted at will.

An hBN particle that is surface-coated with a sufficient amount of ferromagnetic material to be readily orientable in a magnetic field of less than 100 gauss will exhibit an increase in electrical conductivity that is undesirable in some important applications, such as circuit boards and the like. The interstitially disposed ferrogmagnetic metal imparts the desired degree of magnetic orientability without a concomitant increase in electrical conductivity.

For the purposes of the present invention, when a range of values is provided said range shall be understood to encompass the stated end-points thereof. Further, numerical values provided herein are provided in the number of significant figures intended according to conventional rules, and should be so interpreted.

For the purposes of the present invention the term "modified hBN" shall be understood to refer to the composition hereof comprising hexagonal boron nitride platelet particles comprising a plurality of registered layers of hexagonal boron nitride and one or more layers of a ferromagnetic metal interstitially disposed between said layers of boron nitride. The term "composite" shall be understood to refer to a composition comprising the modified hBN hereof dispersed within an organic polymer such that the organic polymer forms a continuous phase and the modified hBN forms a discontinuous phase.

In one aspect, the present invention provides a composition comprising hexagonal boron nitride platelet particles comprising a plurality of registered layers of hexagonal boron nitride and a ferromagnetic metal interstitially disposed between said layers of boron nitride.

Figure 3:
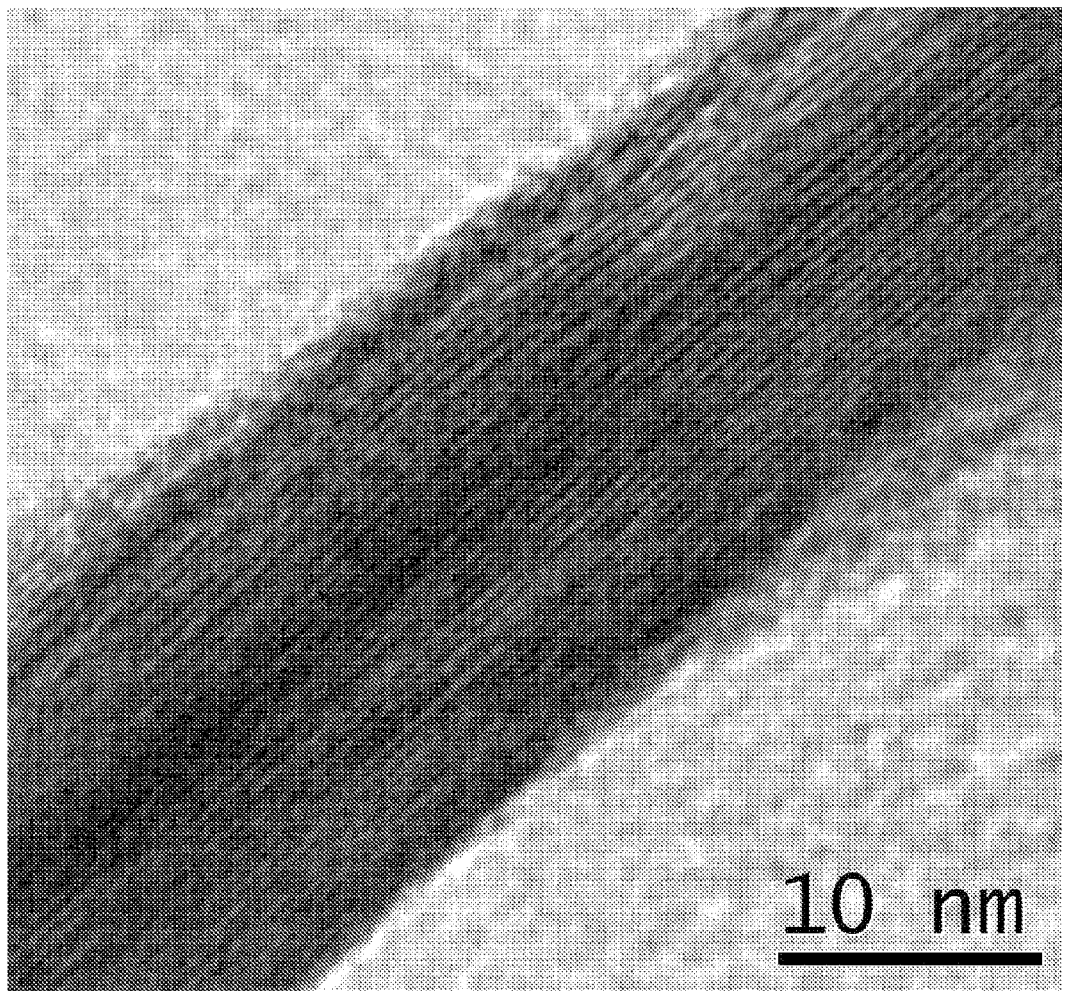
FIG. 3 is a TEM of a cross-section of the modified hBN of Example 1, showing the disruption of the tight packing and linearity of adjacent platelets as a result of the formation of interstitial nano-scale metallic nickel sheet between hBN platelets.

In the present invention, the layers of hBN maintain the mutual registration that characterizes the neat compound; however, the near-perfect order that characterizes the neat compound is disrupted by the interstitial disposition of an epitaxial layer of a ferromagnetic metal between at least one, and typically many, pair of adjacent hBN layers in the modified hBN hereof. The effect hereof is shown in FIGS. 2 and 3 which depict transverse electron micrographs (TEMs) of, respectively, an edge view of a neat hBN platelet particle showing multiple layers in close registration to one another; and, an edge view of a modified hBN platelet particle having interstitially disposed metallic Ni according to the present invention, showing that mutual registration among hBN layers was retained, but the structure was more disordered, and on average the layers were farther apart.

The retention of the registered structure is indicated in XRD analysis.

In one embodiment, the ferromagnetic metal is Co. In an alternative embodiment, the ferromagnetic metal is Ni. In an alternative embodiment, the ferromagnetic metal is Fe. In a further embodiment the ferromagnetic metal is a binary or ternary mixture formed from Fe, Co, and/or Ni. The concentration of the ferromagnetic metal or mixture thereof in the hBN/metal compound ranges from 1% to ca. 12% by weight. At concentrations below 1% the desirable orientability in a magnetic field is obtained at magnetic fields above 100 gauss, which is excessively high for many practical applications. It is found in the practice of the invention that desirable orientability of the ferromagnetic/modified hBN hereof is achieved at 4-6 wt-% of the ferromagnetic metal or mixture thereof. The ferromagnetic metal concentration is readily controlled by controlling the metal to $NH_4^+$ ratio. This is readily achieved in practice by varying the $NH_4^+$ concentration while holding the ferromagnetic metal concentration constant.

In one embodiment, the modified hBN is characterized by a particle size in the range of 0.5 to 50 micrometers (μm). In a further embodiment, the particle size is in the range of 1 to 10 μm.

In a further aspect the present invention provides a process comprising
   combining an aqueous solution of a salt of a ferromagnetic metal and $NH_4OH$ in a molar ratio of metal to $NH_4^+$ in the range of 1:10 to 10:1 to form an aqueous solution.
   combining hexagonal BN in particulate form with the solution so formed to form a slurry;
   drying said slurry; and,
   annealing said dried slurry in a reducing atmosphere at a temperature in the range of ca. 300° C. for a minimum exposure
   period of 60 min to ca. 900° C. for a minimum exposure period of 5 min.

In one embodiment, the ratio of metal to $NH_4^+$ is in the range of 1:2 to 1:1.

In one embodiment the ferromagnetic metal is Ni. In an alternative embodiment, the ferromagnetic metal is Co. In a further alternative embodiment, the ferrogmagnetic metal is Fe. In one embodiment the salt is selected from nitrate, sulphate, or chloride. In a further embodiment, the salt is a nitrate. In a further embodiment, the salt is $Ni(NO_3)_2$.

In one embodiment the neat hBN is characterized by a particle size in the range of 0.5 to 50 μm. In a further embodiment the neat hBN is characterized by a particle size in the range of 1 to 10 μm.

In one embodiment, the drying step and the subsequent annealing are combined into a single step wherein the water in the slurry is extracted during the process of heating to a temperature in the range of ca. 300° C. to ca. 900° C. In one embodiment, the annealing temperature is in the range of 325-375° C. At temperature above 900° C., turbostratic boron nitride will begin to form. At temperatures below 300° C., incomplete reaction will result. Within the designated temperature range, there is no observed upper limit to the time of exposure. Once reaction is complete and the interstitial ferromagnetic sheets have been formed, no further morphological or chemical changes occur.

In an alternative embodiment, the drying step is a separate step executed prior to the annealing step. When the drying step is a separate step, the slurry is preferably dried at a temperature below 100° C. Any conventional drying process known in the art is satisfactory. It is preferred to perform drying in an inert atmosphere. A vacuum oven with a nitrogen purge is a satisfactory method for drying.

The annealing is performed in a reducing atmosphere. Suitable reagents for forming the reducing atmosphere include but are not limited to $H_2$, $NH_3$, $CH_4$, $C_2H^2$ and mixtures thereof. It is also suitable to mix the reducing agent with an inert gas such as but not limited to $N_2$ or Ar.

In a further embodiment, a composite material having a surface comprises a non-flowable organic polymer and modified hBN particles a preponderance of which particle are oriented normal to the surface. In a still further embodiment, said composite material is in the form of a planar film, and at least a portion of said magnetically oriented hBN particles are oriented normal to the plane of the film. The term "normal to the plane of the film" shall be understood to encompass those particles whereof the axis of orientation is disposed less than 90° but greater than 0° with respect to the plane.

There is no limitation on the type of organic polymer that is employed. Both thermoplastic and thermoset polymers may be employed. The modified hBN of the invention will be chemically inert to all of them. The selection of polymer relates more to viscosity than chemistry.

In another aspect the present invention provides a process comprising the steps:
dispersing modified hBN particles in a flowable organic polymer composition to form a flowable composite;
casting a film with said flowable composite;
subjecting said cast film, while still in the flowable state, to an orienting magnetic field; and,
causing said film to be converted to the non-flowable state while still under exposure to said orienting magnetic field.

For the purposes of the present invention, the term "flowable" shall be understood to mean that macroscopic flow will visibly occur within 5 seconds, preferably within less than 1 second from the time that a shear force is applied to the flowable composition. For the purposes herein, "macroscopic flow" means that the flow is visible to the naked eye.

High shear mixing has been found to be useful in dispersing modified hBN into a polymeric matrix. High shear mixing is achieved at the highest possible viscosity at a given shear rate. On the other hand, it is possible for viscosity to be so high that no mixing can occur because the mixer won't work. In such case, viscosity can be decreased by heating in the case of a thermoplastic, or by addition of a solvent in the case of a thermoset or thermoplastic. Concentrations of modified hBN in polymer up to 40% by weight can be achieved.

In practice it has been found satisfactory to disperse by high shear mixing a quantity of modified hBN in a 1-10% solids solution of polymer followed by conventional mixing of the resulting dispersion with additional polymer. Mixing in continuous mixers such as twin-screw extruders, and batch mixers such as brabenders is satisfactory.

In the practice of the invention, the resulting composite is then formed into a film. Numerous methods for film casting are known in the art. These include solution casting using a doctor blade, solution coating of a substrate from which the finished film is removed, and melt casting onto a rotating drum. Melt casting is preferred for high molecular weight film type thermoplastic polymers. Solution casting, or, more broadly, low-viscosity liquid casting is preferred for thermosets, poly(amic acid) and the like. Excessively low viscosity makes film formation difficult, and the resulting film non-uniform.

While the film is still in the form of a viscous liquid (that is, in a flowable state), it is subject to a magnetic field of less than 100 gauss for a period of time sufficient to induce at least a portion of the modified hBN to become oriented in the desired direction. With the magnetic field still applied the film is then subject to solidification, after which the magnetic field is removed. In the case of thermoplastic film, solidification proceeds by thermal quenching. In the case of thermoset films, solidification proceeds by cross-linking. In the case of polyimide films solidification occurs by imidization. The specific geometry of the film casting apparatus, and the specific nature of the film itself will determine the optimum area for application of the magnetic field.

At a given magnetic field intensity, high viscosity will result in less alignment and low viscosity in greater alignment of the hBN. XRD data showed that at 80 Gauss polymer having a viscosity of 200 poise needed less than 1 min exposure to achieve complete alignment.

The invention is further described, but not limited, in the following specific embodiments.

EXAMPLES

Comparative Example: A 0.597 g of boric acid and 1.213 g of urea from Sigma Aldrich were mixed by hand in a ceramic bowl from the Coors Company. Then, 0.1452 g of hexagonal boron nitride (PT120 grade)) was added to the mixture. The resulting mixture was heated at 80° C. for 2 hours in a quartz tube furnace from First Nano under a nitrogen atmosphere. The inert atmosphere was established by the flow of nitrogen (Scientific grade from GTS) at 1 Umin through a calibrated MKS electronic flow meter. The quartz tube furnace was purged at room temperature prior to heating to 80 C with nitrogen gas for 30 min to lower the amount of oxygen to less than 0.1%. The partial pressure of oxygen inside the tube furnace was monitored with a residual gas analyzer (RGA, SRS-100) from Stanford Research System. At end of the 2 hours soak at 80 C, the temperature of the furnace was ramped to 240 C in 5 min and held steady for 1 hour. The furnace was turned off at the end of 1 hour soak at 240 C to cool down to room temperature under the nitrogen atmosphere. The processed powder was mixed with 0.060 g of nickel powder with an average particle size of 3 Jlm and then transferred to an alumina boat and placed inside a Lindberg furnace equipped with an alumina tube. The alumina tube furnace was pumped out for 10 min using a turbo V-70 vacuum pump from Varian and backfilled with nitrogen gas to lower the amount of O2 inside the furnace to less than 0.1%. The temperature of the furnace was ramped to 1150 C in 30 min under a mixture of nitrogen and ammonia gases. The mixture of nitrogen and ammonia was established by the flow of 100 sccm of N2 and 30 sccm of ammonia through separate MKS electronic flow meters. At the end of the 2 hours soak at 1150 C, the furnace was turned off to cool down to room temperature under the atmosphere formed by the mixture of nitrogen and ammonia.

Figure 4:
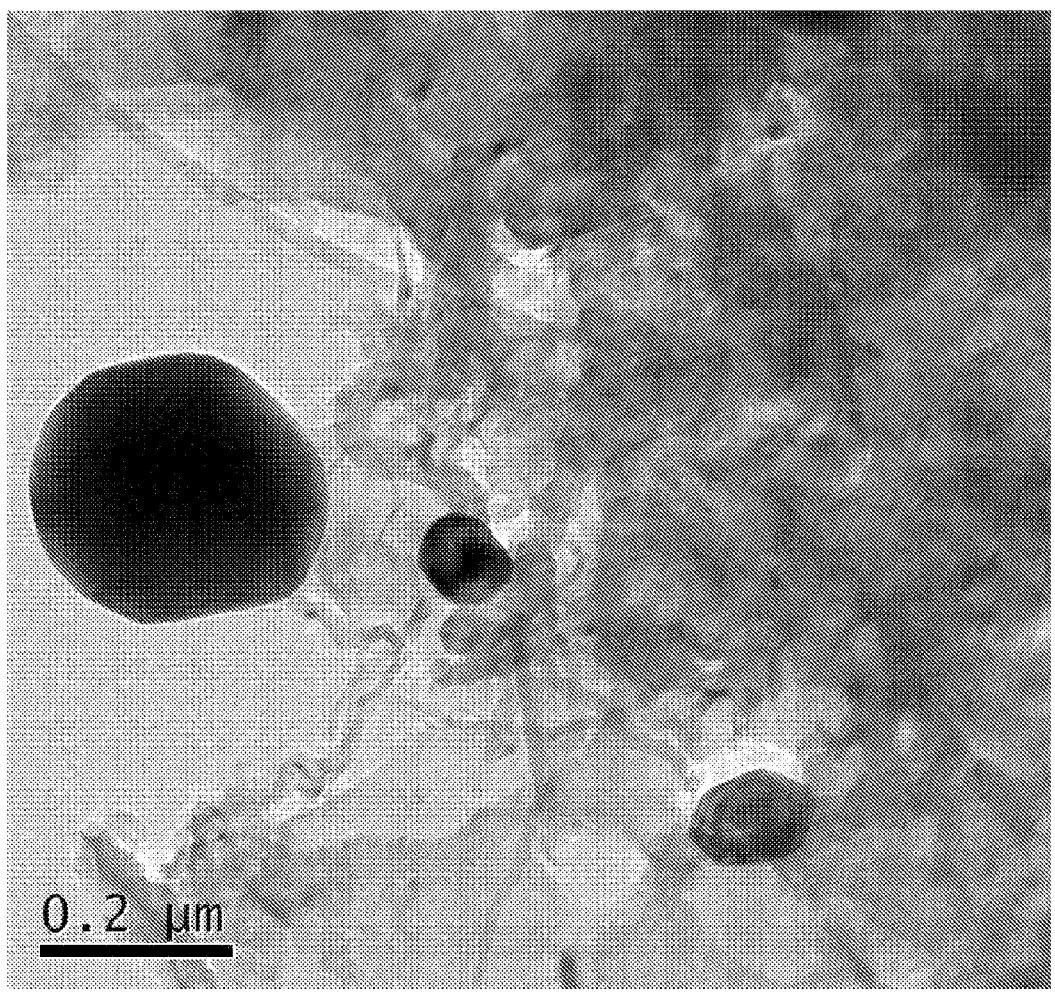
FIG. 4 is a scanning electron micrograph (SEM) of the surface of a hBN particle with a few particles of nickel scattered about, as prepared according to Comparative Example A.
Figure 5:
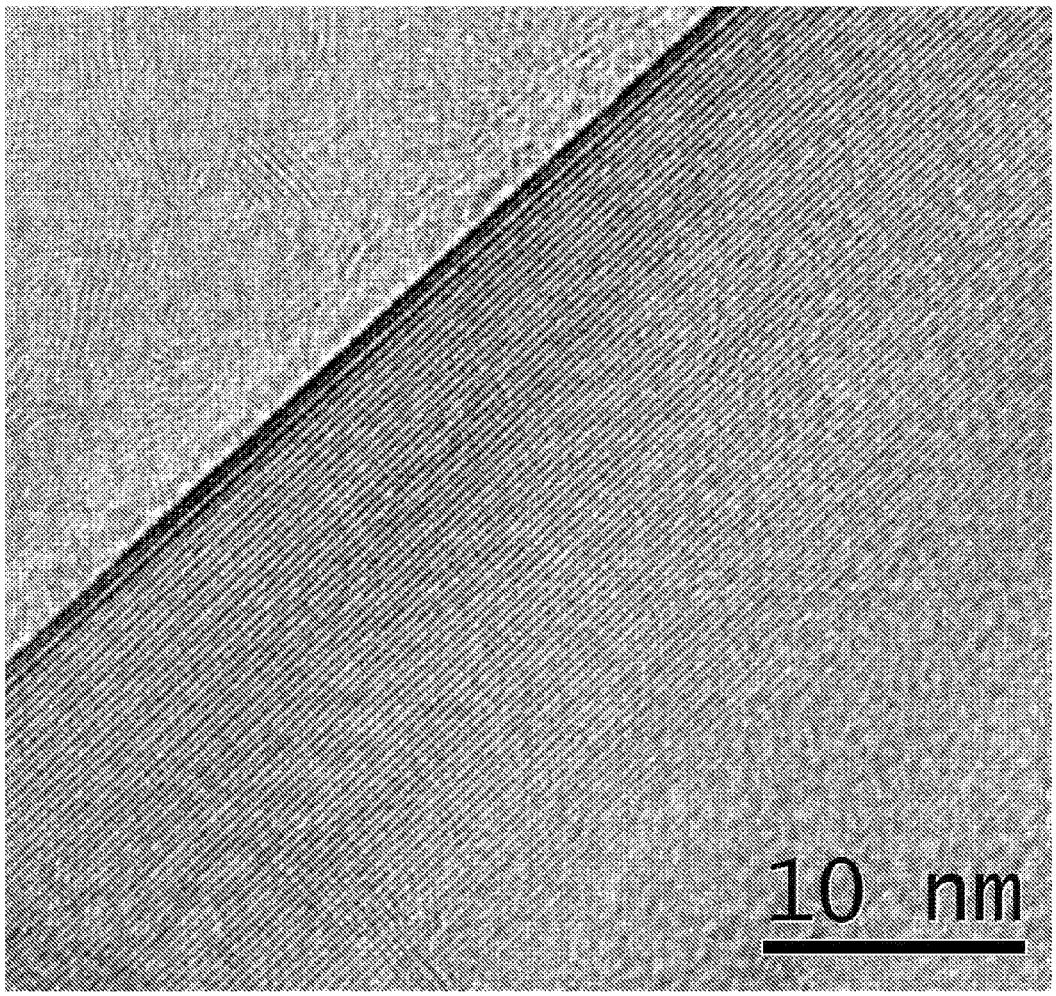
FIG. 5 is a TEM of the cross-section of the hBN plus nickel compound of Comparative Example A. The morphology is indistinguishable from that in FIG. 2.
Figure 6:
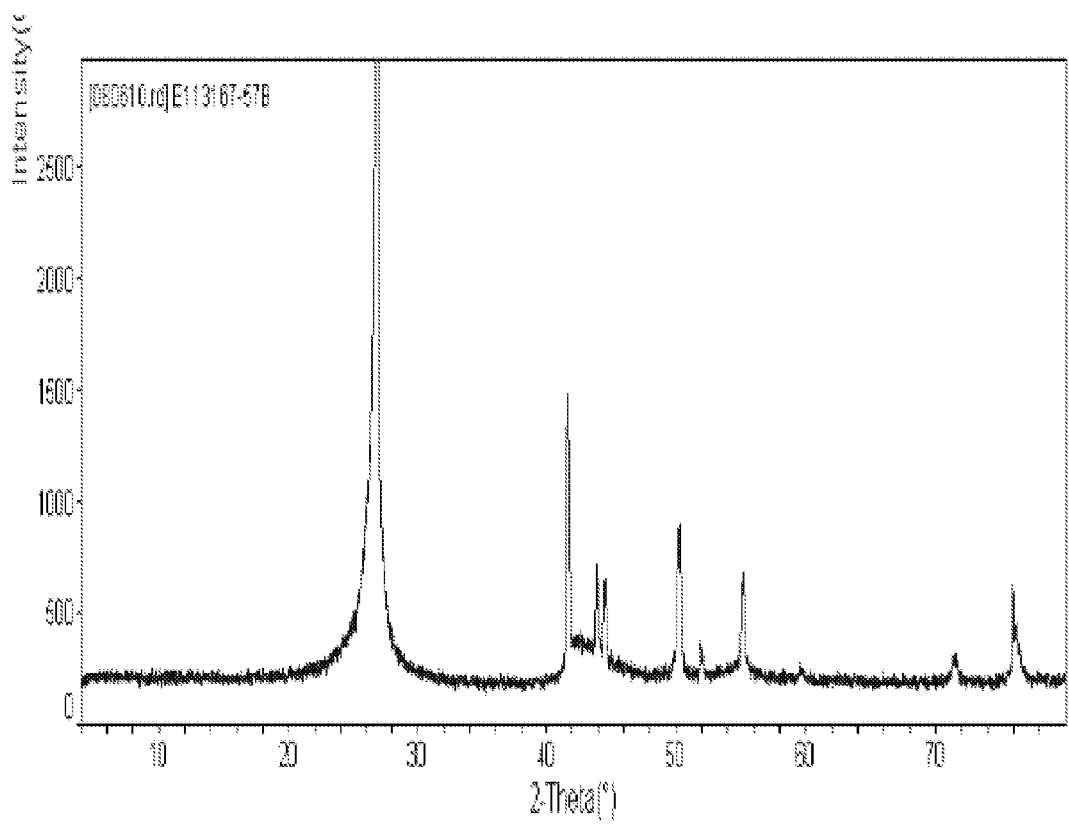
FIG. 6 show the x-ray diffraction (XRD) results obtained on the compound of Comparative Example A. The shoulder in the range of $42 \leq 2\theta \leq 44$ is indicative of the formation of turbostratic BN.

TEM analysis of the resulting nickel boron nitride composition, shown in FIG. 4, showed no deposits of nickel nanoparticles on the surface of boron nitride. Instead, the nickel appeared particles were estranged from the boron nitride platelets. FIG. 5 shows a TEM of the edge of the boron nitride platelets showing no evidence of the formation of nickel nano-structures between adjacent layers of boron nitride, and was identical in appearance to the as-received hBN shown in FIG. 2. X-ray diffraction (XRD) analysis of the nickel/boron nitride mixture produced according to this Comparative Example indicated the formation of turbostratic boron nitride, FIG. 6. The shoulder observed between [100] and [101] peaks at 2θ=42 and 2θ=44 has been attributed by O. Yamamoto in U.S. Pat. No. 6,306,358 to the formation of turbostratic boron nitride.

Example: 1

1.667 ml of concentrated NH$_4$OH (28-30% assay, EMD) was combined with 50 ml of Ni(NO$_3$)$_3$.6H$_2$O (200 mM in distilled water, 99.9985% pure, Alfa Aesar). The resulting solution was combined with 3 g of hBN (PT620, Momentive Performance Materials, Albany, N.Y.) to form a solution/dispersion. The solution dispersion was stirred using a magnetic stirrer overnight at room temperature. After stirring, the solution dispersion was filtered through a paper filter. The residue was placed in a home-made quartz crucible and dried in a vacuum oven at 80° C. for 30 min. The thus dried residue was then inserted into a quartz tube furnace (First Nano, Ronkonkoma, N.Y.) at room temperature. The furnace was purged with N$_2$ (UHP grade from GTS) to reduce the O$_2$ concentration to below 0.1%. The partial pressure of oxygen inside the tube furnace was monitored with a residual gas analyzer (SRS-100 from Stanford Research Systems, Sunnyvale, Calif.) annealed by heating in a quartz tube furnace at 350° C. for 1 hr. in an atmosphere of N$_2$ (Scientific Grade, GTS) and H$_2$ (Scientific Grade, GTS). Using calibrated electronic flow meters (MKS, Andover, Mass.) the N$_2$ flow rate was set to 850 sccm, and H$_2$ was introduced at a flow rate of 150 sccm. Maintaining those gas flows, the furnace was heated to 350° C., and held for 1 hour, followed by cooling under the same gas flows, to form the annealed powder.

Figure 7:
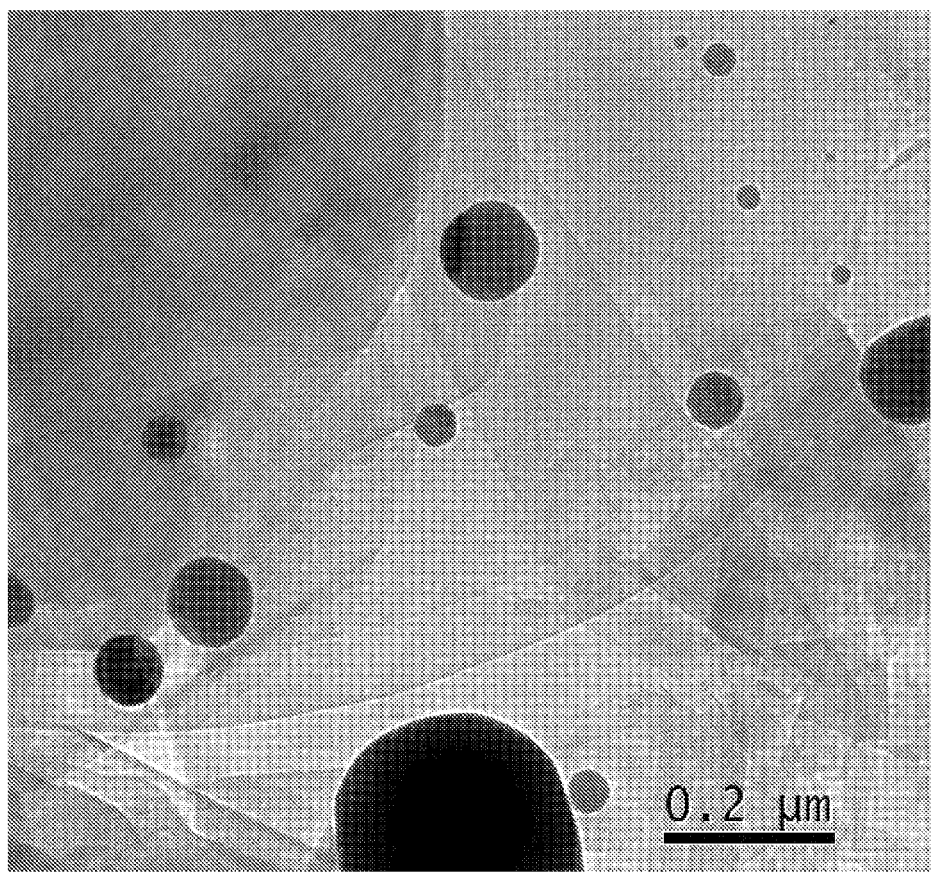
FIG. 7 is a SEM of the surface of the Ni-modified hBN of Example 1. Numerous metallic Ni particles are shown adhering to the surface, as well as below the surface layer.

The annealed powder was characterized with transmission electron microscopy (TEM). High-resolution TEM (FIG. 7) of the thus prepared nickel-modified boron nitride indicated that the surfaces of the boron nitride platelets were decorated with nickel nano-particles with a diameter ranging from 2 to 300 nm. The nano-particles appear uniformly distributed on the surface of boron nitride platelets and coated with a thin oxide layer since nickel is readily oxidizable in air. FIG. 7 also shows regions of Ni beneath the surface layer of boron nitride platelets.

Figure 8:
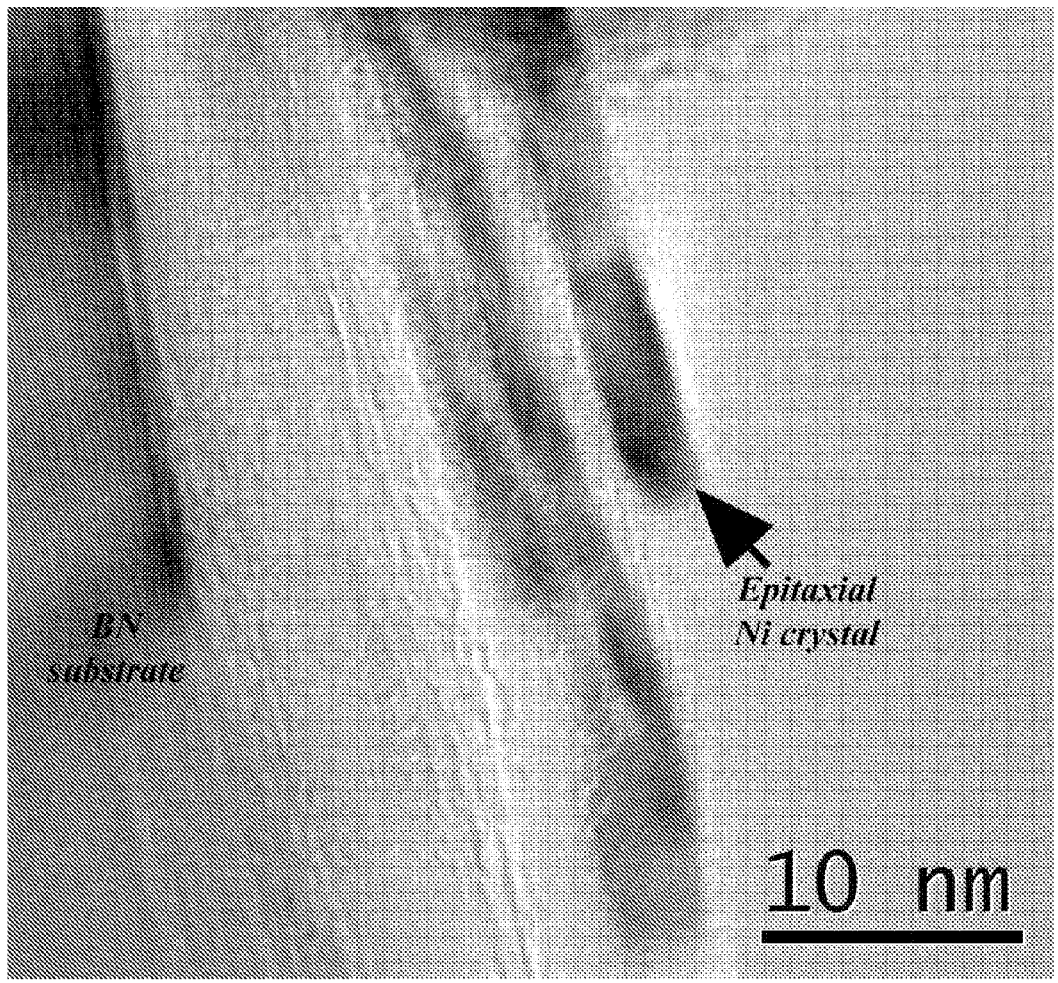
FIG. 8 is a TEM showing the growth of epitaxial Ni crystals along the edge of the Ni-modified hBN of Example 1.

TEM also revealed that nickel formed nanometer scale epitaxial structures along the edges of the boron nitride platelets (FIG. 8). The dark contrast shown along the particle edge in FIG. 8 is due to nanostructures 5 nm wide and 25 nm long. FIG. 3 shows a cross-section of the modified hBN exhibiting distortion in the packing of the boron nitride layers as compared to the high regularity and close packing shown in FIG. 2 which depicts the as-received hBN. Deformed and wavy layers with non-uniform spacing are clearly visible in FIG. 3, and absent in FIG. 2.

Figure 9:
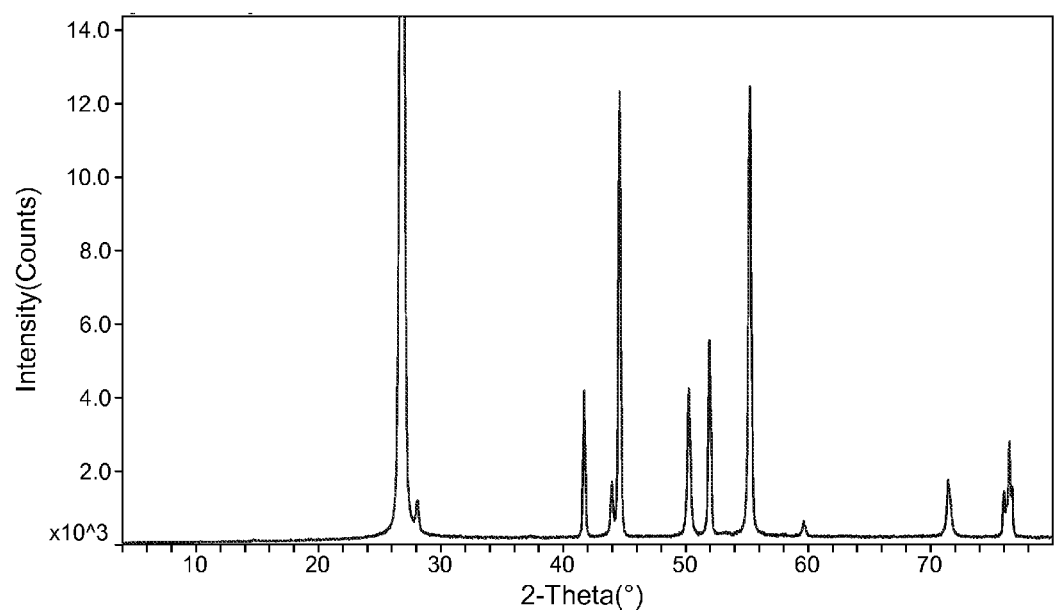
FIG. 9 shows the X-ray diffraction results obtained on the Ni-modified hBN of Example 1, showing peaks corresponding to high concentrations of crystalline metallic Ni, and no indication of turbostratic BN.

The XRD (FIG. 9) of the modified hexagonal boron nitride so prepared showed sharp peaks at 2θ=44.5 and 2θ=52 indicated the presence of highly crystalline Ni. There was no indication of the presence of turbostratic BN.

Examples: 2-4

The materials and procedures of Example 1 were replicated except that 6 g, 9 g and 12 g aliquots of the hexagonal boron nitride were added to three solutions of nickel nitrate in DI water. After annealing at 600° C., ICP (Inductively Coupled Plasma) analysis showed that the amount of nickel in the modified hBN so formed were 6.26, 4.60 and 3.47%, respectively.

Examples: 5-7

Figure 10:
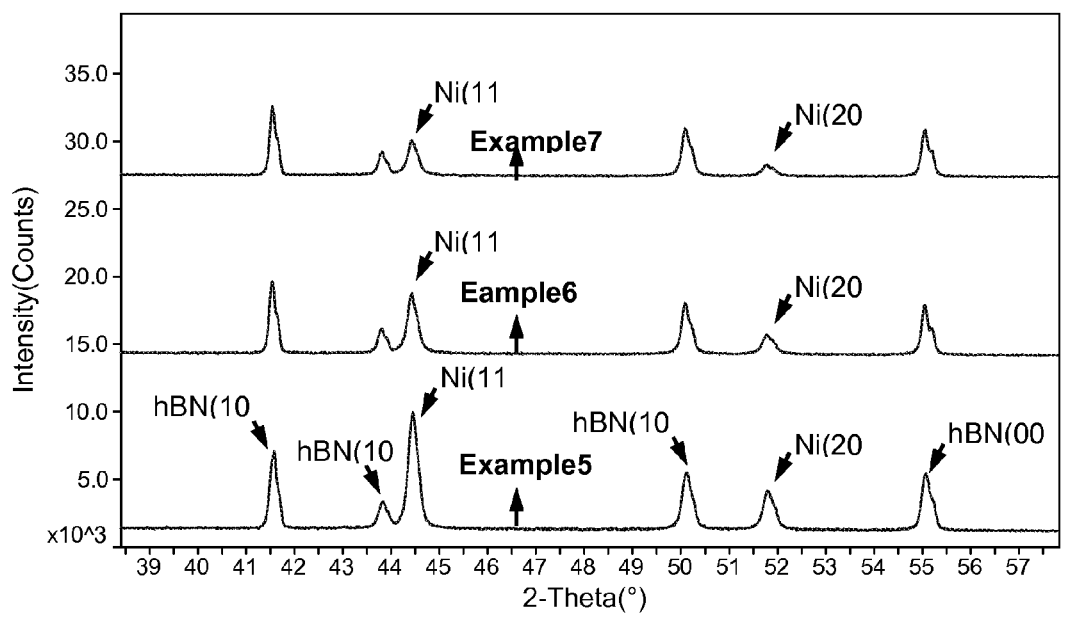
FIG. 10 shows the X-ray diffraction results obtained on the Ni-modified hBN of Examples 5-7, showing peaks corresponding to high concentrations of crystalline metallic Ni, and no indication of turbostratic BN.

The materials and procedures of Examples 2-4 were replicated except that annealing was conducted at 350° C. for 1 hour for each aliquot. 6 g, XRD analysis (FIG. 10) of the thus prepared modified hBN specimens showed the presence of highly crystalline Ni in each case, with smaller percentages of Ni as the relative amount of hBN in each aliquot was increased. No sign of turbostratic BN was seen.

Example: 8

Figure 11:
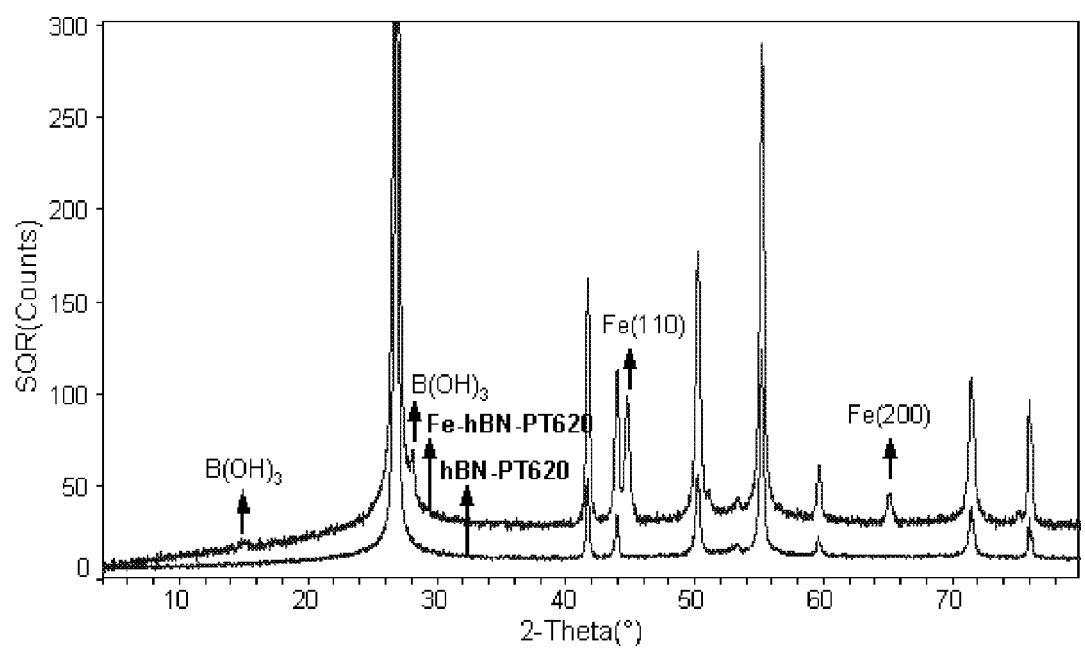
FIG. 11 shows the X-ray diffraction results obtained on the Fe-modified hBN of Example 8, showing peaks corresponding to high concentrations of crystalline metallic Fe, and no indication of turbostratic BN.

The materials and procedures of Example 1 were replicated except that 2.225 ml of the NH$_4$OH was employed, and 50 ml of a 200 mM aqueous solution of Fe(NO$_3$)$_3$.9H$_2$O (99.999% pure from Alfa Aesar) was used in place of the 50 ml of Ni(NO$_3$)$_3$.6H$_2$O. XRD of the modified hBN thus produced (FIG. 11) showed the presence of highly crystalline Fe. No evidence of turbostratic BN was seen.

Example 9

The materials and procedures of Example 1 were replicated except 50 ml of a 200 mM aqueous solution of Co(NO$_3$)$_2$.6H$_2$O (200 mM in distilled water, 99.999% pure, from Alfa Aesar) was used in place of the 50 ml of Ni(NO$_3$)$_3$.6H$_2$O. XRD of the modified hBN thus produced (FIG. 12) showed the presence of highly crystalline Co. No evidence of turbostratic BN was seen.

Example: 10

0.7998 g of Ni-modified hBN was prepared as in Example 1 except that the annealing temperature was 600° C., and PT120 hBN was employed having an average particle size in the range of 8-14 micrometers. 2.0008 g of the resin component from QuickCure® epoxy (SystemThree Resins, Inc.) was diluted with 0.5 ml of methyl-ethyl ketone. The Ni-modified hBN and diluted resin were mixed overnight at room temperature using a Color Squid™ magnetic stirrer (IKA Works, Inc., Wilmington, N.C.). 2.0144 g of the hardener component of the QuickCure® epoxy was added to the dispersion so formed, and mixed by hand using a spatula for 1 min. The thus prepared mixture was quickly spread on a clean glass plate (7×7 inches) using a two-path wedge gap film applicator from GARDCO having an overall width of 6 in and a gap of 0.008 in to produce 2 films 50 to 75 flm thick separated by a gap of 1 inch or more.

Two electromagnets separated by a 2 mm gap were connected in parallel but with reversed polarity to a DC power supply. A current of 0.4 A generated a magnetic field of 800 Gauss in the gap. The glass plate was immediately inserted into the 2 mm gap in such manner that only one of the two films was exposed to the magnetic field. The plate was held in place for 20 min while the films underwent curing.

Two-inch diameter samples were cut from each of the epoxy films The thermal conductivity normal to the plane of the films was determined using an LFA457 MicroFlash from Netzsch Instruments. The epoxy film that had not been exposed to the magnetic field during curing had a thermal conductivity of 0.337 W/m·K whereas the epoxy film that had been exposed to the magnetic field had a thermal conductivity of 0.702 W/m·K. The thermal conductivity of an unfilled epoxy film of the same epoxy was 0.2 W/m·K.

Example: 11

Example 10 was replicated except that 0.7995 g of the modified hBN prepared in the manner of Example 1 was combined with 1.9995 g of the resin and 2.011 g of the hardener. In this example, the hBN employed was PT620 having an average particle size in the range of 16-30 micrometers. The epoxy film that had not been exposed to the magnetic field during curing had a thermal conductivity of 0.345 W/m·K whereas the epoxy film that had been exposed to the magnetic field had a thermal conductivity of 0.656 W/m·K.

Example: 12

Example 10 was replicated except that 0.7978 g of modified hBN prepared in the manner of Example 1 was mixed with 2.0394 g of the resin and 1.9576 g of hardener. In this example, the hBN employed was PTX25 (Momentum Performance Materials, Albany, N.Y.) with an average particle size of ca. 25 micrometers. The epoxy film that had not been exposed to the magnetic field during curing had a thermal conductivity of 0.544 W/m·K whereas the epoxy film that had been exposed to the magnetic field had a thermal conductivity of 0.907 W/m·K.

Example: 13

Example 10 was replicated except that 0.8024 g of modified hBN prepared in the manner of Example 1 was mixed with 1.9845 g of the resin and 2.0245 g of the hardener. In this example, the hBN employed was NX1 (Momentum Performance Materials, Albany, N.Y.) with an average particle size in the range of 0.7-1 micrometer. The epoxy film that had not been exposed to the magnetic field during curing had a thermal conductivity of 0.321 W/m·K whereas the epoxy film that had been exposed to the magnetic field had a thermal conductivity of 0.845 W/m·K.

Example 14

A polyamic acid was prepared from reaction of 100 parts of a diamine known in the art as RODA having the structure:

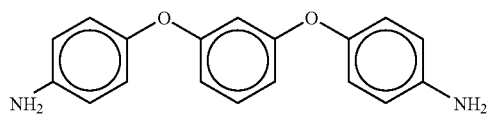

with 80 parts of a dianhydride known in the art as ODPA having the structure

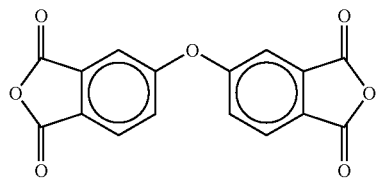

and 20 parts of pyromellitic dianhydride, having the structure

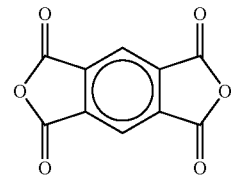

according to Example 4 of U.S. Pat. No. 5,298,331.

2.61 g of the polyamic acid so prepared was dissolved in 2.20 g of dimethylacetamide in a glass vial. 0.50 g Ni-modified hBN prepared according to the method of Example 1 was added to the vial, and the ingredients were mixed overnight at room temperature using a Color Squid® magnetic stirrer. The slurry so produced was spread on a clean glass slide (7×7 inches) using a two-path wedge gap film applicator from GARDCO having an overall width of 6 inches and a gap of 8 mils to produce a 50 μm thick film.

Prior to the preparation of the film, an electromagnet was positioned within the sample chamber of a Phillips (now PANanalytical) X'pert multipurpose x-ray diffractometer.

Figure 12:
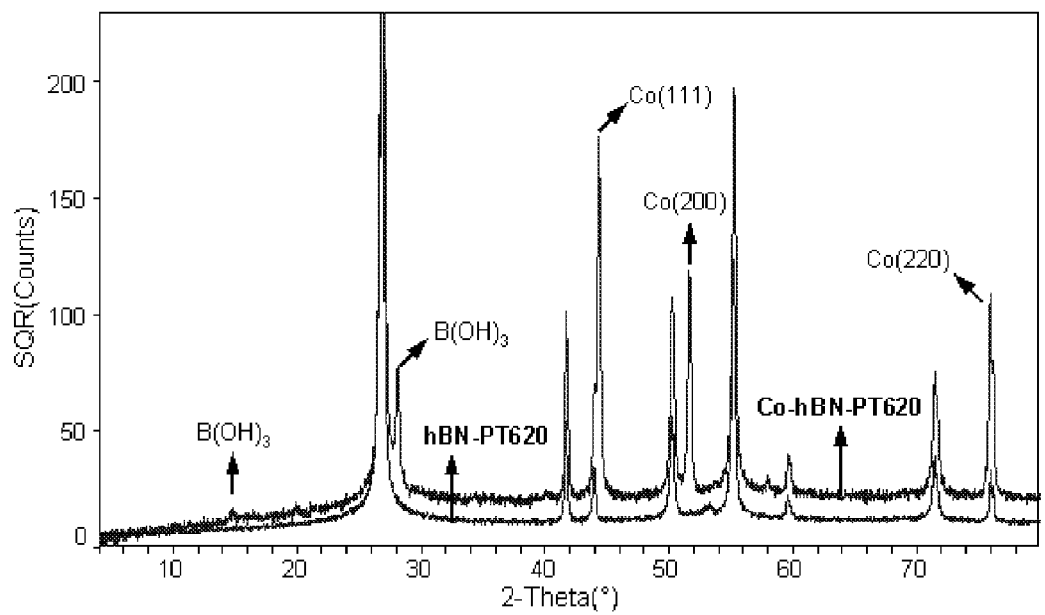
FIG. 12 shows the X-ray diffraction results obtained on the Co-modified hBN of Example 9, showing peaks corresponding to high concentrations of crystalline metallic Co, and no indication of turbostratic BN.
Figure 13:
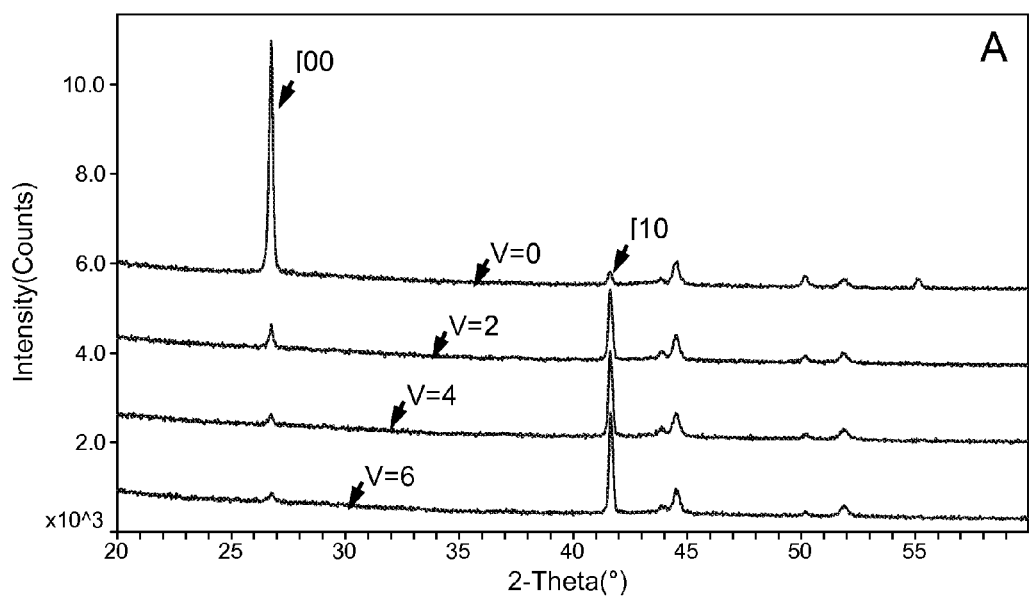
FIG. 13 shows the XRD patterns at different magnetic field strengths as crystalline orientation changes in the magnetic field of the modified hBN/polyamic acid composite of Example 14.

Each film specimen was immediately placed on top of the electromagnet after it was prepared. The voltage applied to the electromagnet was varied from specimen to specimen stepwise by 2-volt increments from 0 to 6 volts, which corresponded to magnetic fields ranging from 0 to 120 Gauss. In each case, the film was exposed to the applied magnetic field for 3 minutes before the x-ray diffraction measurement was made. FIG. 12 shows the x-ray diffraction pattern generated by each specimen under the applied magnetic field. The shift of relative peak intensity with increasing voltage applied to the electromagnet indicated a shift in orientation with increasing magnetic field.

After exposure to the magnetic field, each film was imidized by heating.

A similar film prepared from unmodified, as received PT620 hBN showed no effect of magnetic field on x-ray diffraction results.

What is claimed is:

1. A composition comprising modified hexagonal boron nitride (hBN) particles comprising a plurality of registered layers of hexagonal boron nitride and a ferromagnetic metal interstitially disposed between said layers of boron nitride.

2. The composition of claim 1 wherein the ferromagnetic metal is Ni.

3. The composition of claim 1 wherein the modified hexagonal boron nitride particles have a particle size in the range of 0.5 to 50 micrometers.

4. The composition of claim 1 wherein the ferromagnetic metal is present at a concentration of 4 to 6% by weight relative to the weight of the composition.

5. The composition of claim 1 wherein the ferromagnetic metal is present in the form of particles with a diameter ranging from 2 to 300 nm.

6. The composition of claim 1 further comprising an organic polymer.

7. The composition of claim 6 wherein the organic polymer is in a flowable state.

8. The composition of claim 7 wherein the organic polymer is an uncured epoxy resin or a polyamic acid.

9. The composition of claim 6 wherein the organic polymer is in a non-flowable state.

10. The composition of claim 9 wherein the organic polymer is a cured epoxy resin or a polyimide.

11. The composition of claim 6, where the modified hexagonal boron nitride is provided at a concentration range of 1 to 40% by weight of the composition.

12. A film comprising an organic polymer and modified hexagonal boron nitride particles dispersed therewithin, said modified hexagonal boron nitride particles comprising a plurality of registered layers of hexagonal boron nitride and a ferromagnetic metal interstitially disposed between said layers of boron nitride.

13. A process for obtaining modified hexagonal boron nitride particles comprising a plurality of registered layers of hexagonal boron nitride and a ferromagnetic metal interstitially disposed between said layers of boron nitride, the process comprising the steps:
(a) combining an aqueous solution of a salt of a ferromagnetic metal and $NH_4OH$ in a molar ratio of metal to $NH_4^+$ in the range of 1:10 to 10:1 to form an aqueous solution;
(b) combining hexagonal BN in particulate form with the solution so formed to form a slurry;
(c) drying said slurry; and
(d) annealing said dried slurry in a reducing atmosphere at a temperature in the range of ca. 300° C. for a minimum exposure period of 60 min to ca. 900° C. for a minimum exposure period of 5 min.

14. The process of claim 13 wherein the ferromagnetic metal is Ni.

15. The process of claim 13 wherein the hexagonal boron nitride particles have a particle size in the range of 0.5 to 50 micrometers.

16. The process of claim 13 wherein said drying and annealing are conducted in a single step.

17. The process of claim 13 wherein the metal to $NH_4^+$ ratio is in the range of 1:2 to 1:1.

18. The process of claim 13 wherein the reducing atmosphere comprises $N_2$ and $H_2$.

19. The process of claim 13 further comprising the steps:
(e) dispersing the modified hexagonal boron nitride particles comprising a plurality of registered layers of hexagonal boron nitride and a ferromagnetic metal interstitially disposed between said layers of boron nitride in a flowable organic polymer to form a flowable composition;
(f) casting a film with said flowable composition;
(g) subjecting said cast film, while still in the flowable state, to an orienting magnetic field to form magnetically oriented modified hBN particles; and
(h) causing said film to be converted to a non-flowable state while at least a portion of said magnetically oriented modified hBN particles retain their magnetic orientation.

20. The process of claim 19 wherein the ferromagnetic metal is Ni.

* * * * *